United States Patent
Yamazaki et al.

(10) Patent No.: US 10,992,920 B2
(45) Date of Patent: Apr. 27, 2021

(54) STEREO IMAGE PROCESSING DEVICE

(71) Applicant: Hitachi Automotive Systems, Ltd., Hitachinaka (JP)

(72) Inventors: Kazuyoshi Yamazaki, Tokyo (JP); Keiichi Betsui, Tokyo (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/634,699

(22) PCT Filed: May 1, 2018

(86) PCT No.: PCT/JP2018/017424
§ 371 (c)(1),
(2) Date: Jan. 28, 2020

(87) PCT Pub. No.: WO2019/030995
PCT Pub. Date: Feb. 14, 2019

(65) Prior Publication Data
US 2020/0213574 A1  Jul. 2, 2020

(30) Foreign Application Priority Data

Aug. 7, 2017 (JP) .............................. JP2017-152626

(51) Int. Cl.
| | | |
|---|---|---|
| H04N 13/00 | (2018.01) | |
| H04N 13/204 | (2018.01) | |
| H04N 13/128 | (2018.01) | |
| H04N 13/296 | (2018.01) | |
| A61B 1/04 | (2006.01) | |
| H04N 7/18 | (2006.01) | |

(52) U.S. Cl.
CPC ......... *H04N 13/204* (2018.05); *H04N 13/128* (2018.05); *H04N 13/296* (2018.05); *H04N 2013/0081* (2013.01)

(58) Field of Classification Search
USPC .............................................. 348/47, 42, 61
See application file for complete search history.

(56) References Cited

U.S. PATENT DOCUMENTS

| | | |
|---|---|---|
| 5,874,904 A | 2/1999 | Hirabayashi et al. |
| 2004/0070667 A1* | 4/2004 | Ando ................... H04N 13/296 348/46 |

(Continued)

FOREIGN PATENT DOCUMENTS

| | | |
|---|---|---|
| JP | 10-62163 A | 3/1998 |
| JP | 2003-510666 A | 3/2003 |

(Continued)

OTHER PUBLICATIONS

Japanese-language Office Action issued in Japanese Application No. 2017-152626 dated Jun. 23, 2020 (five (5) pages).

(Continued)

*Primary Examiner* — Daquan Zhao
(74) *Attorney, Agent, or Firm* — Crowell & Moring LLP

(57) ABSTRACT

The purpose of the present invention is to provide a stereo image processing device that is capable of expanding the effective field of view by using a lens having distortion for realizing a wide field of view. This stereo image processing device has two sensors arranged so as to be shifted from the optical axes of respective lenses in directions separating each other, wherein each of the lenses has a property such that the distortion, in a region of a large viewing angle, is greater than that of an fθ lens.

12 Claims, 9 Drawing Sheets

(56) References Cited

U.S. PATENT DOCUMENTS

| | | |
|---|---|---|
| 2006/0266835 A1 | 11/2006 | Tanida |
| 2014/0210945 A1 | 7/2014 | Morizumi et al. |
| 2014/0300799 A1* | 10/2014 | Yoshino ............ H04N 5/23296 348/347 |
| 2017/0074651 A1 | 3/2017 | Akimoto |
| 2017/0314917 A1 | 11/2017 | Murata et al. |

FOREIGN PATENT DOCUMENTS

| | | |
|---|---|---|
| JP | 2005-24463 A | 1/2005 |
| JP | 2006-333120 A | 12/2006 |
| JP | 2014-140594 A | 8/2014 |
| JP | 2014-238558 A | 12/2014 |
| WO | WO 01/24515 A1 | 4/2001 |
| WO | WO 2015/182147 A1 | 12/2015 |
| WO | WO 2016/068095 A1 | 5/2016 |

OTHER PUBLICATIONS

International Search Report (PCT/ISA/210) issued in PCT Application No. PCT/JP2018/017424 dated Jul. 24, 2018 with English translation (four (4) pages).

Japanese-language Written Opinion (PCT/ISA/237) issued in PCT Application No. No. PCT/JP2018/017424 dated Jul. 24, 2018 (four (4) pages).

* cited by examiner

STEREO IMAGE PROCESSING DEVICE

TECHNICAL FIELD

The present disclosure relates to a stereo image processing device.

BACKGROUND ART

Stereo camera technique is one of techniques for identifying three dimensional objects. This technique detects a disparity according to triangulation using a difference of images between two cameras arranged at different positions respectively, thereby detecting depths or positions of objects using the disparity. By using this technique, it is possible to precisely detect positions of observed targets. On the other hand, stereo camera technique has a technical problem that it has narrow effective field of view.

Patent Literature 1 listed below describes as "PROBLEM TO BE SOLVED" that "To provide an imaging device that can reduce the content of arithmetic processing, while securing sufficient field of view, to enable high-speed processing operation.", and also describes as "SOLUTION" that "Right and left cameras 4 and 6 offset the imaging center as the center of an imaging element with respect to the optical center as the optical axis of an optical lens by the same amount in opposite directions in the baseline direction. In corresponding point search, a corresponding point R observed in an image photographed by the right camera 6 is taken as a reference point to start searching for a corresponding point L in an image photographed by the left camera 4. In this way, compared with the case where an infinite distance corresponding point is taken as a reference point, parallax can be reduced, and the content of arithmetic processing can be reduced to enable high-speed processing operation" (refer to ABSTRACT).

Patent Literature 2 listed below describes as "PROBLEM TO BE SOLVED" that "To provide a wide effective visual field by also utilizing a non-stereoscopic imaging area, while obtaining precise distance information from a stereoscopic imaging area.", and also describes as "SOLUTION" that "The optical axes of respective cameras 1a and 1b of a stereo camera 1 are arranged so as to be non-parallel on the same plane, the effective visual field is enlarged by the stereoscopic area RM and the non-stereoscopic area RS, a pivot 3 is provided to the central position of a stay 2, and the overall camera system is rotated by a driving motor 4 so that the wide area can be scanned. Accordingly, in the application to an intruding object monitoring apparatus, when the object intrudes into the visual field of either camera, the object can be detected. Thus, the detectable range can be enlarged, when compared with the apparatus using the stereo camera in which the optical axes are arranged parallel. Further, when compared with the monitoring apparatus in which a plurality of monocular cameras are merely provided together, the secure detection simultaneously using the stereo system can be performed so that the reliability can be improved by preventing incorrect detection" (refer to ABSTRACT).

Patent Literature 3 listed below describes that "A stereo camera apparatus, and a vehicle provided with a stereo camera apparatus, can detect an object targeted for detection in a wider spatial range, calculate the distance to a subject with high accuracy, and perform object detection with high accuracy. The stereo camera apparatus (1) includes a first imaging unit (2), a second imaging unit (3) that images an area partially shifted from an area imaged by the first imaging unit (2) in a direction differing from a direction along the baseline length, and a controller (4) that calculates the distance to a subject using an overlapping region between a first image captured by the first imaging unit (2) and a second image captured by the second imaging unit (3)" (refer to ABSTRACT).

CITATION LIST

Patent Literature

PTL 1: JP Patent Publication 2014-238558 A
PTL 2: JP Patent Publication 2005-024463 A
PTL 3: WO 2015/182147

SUMMARY OF INVENTION

Technical Problem

The imaging device in PTL1 includes two sensors that receive light. The left sensor receives light from the left lens, and the right sensor receives light from the right lens. In PTL1, the center of the left sensor is shifted away from the right lens with respect to the optical axis of the left lens, and the center of the right lens is shifted away from the left lens with respect to the optical axis of the right lens. PTL1 attempts to enlarge the stereo field of view according to such optical configurations. On the other hand, in PTL1, the range of field of view detectable by the sensors depends on the sensor size. Thus in order to further increase the effective field of view, it may be required for PTL1 to increase the device size, for example.

PTL2 inclines two cameras to generate a stereo field of view and a non-stereo field of view (monocular field of view), thereby enlarging the effective field of view. However, if the peripheral portions of the captured image are distorted in PTL2, the accuracy for detecting depth and position of objects is a problem to be solved. Specifically, peripheral portions of wide field lens are distorted with respect to the central portion, and thus detection accuracy may be significantly decreased. For such reasons, PTL2 may be effective only for cases that use lenses with small distortions.

PTL3 shifts the sensor in the vertical direction. This configuration may be less effective in enlarging field of view using distorted lens. In addition, PTL3 has a little effect in enlarging field of view in the horizontal direction.

The present disclosure is made in the light of the technical problem above. The present disclosure is to provide a stereo image processing device that enlarges an effective field of view by using a wide field lens with a distorted portion.

Solution to Problem

In a stereo image processing device according to this disclosure, two sensors are placed so that they are shifted away from each other with respect to an optical axis of a lens, and the lens has a characteristic in which a distortion is larger than that of an fθ lens at a region of large viewing angle.

Advantageous Effects of Invention

With the stereo image processing device according to this disclosure, it is possible to enlarge an effective field of view by using a wide view lens with a distorted portion.

DESCRIPTION OF EMBODIMENTS

Embodiment 1

Figure 1:
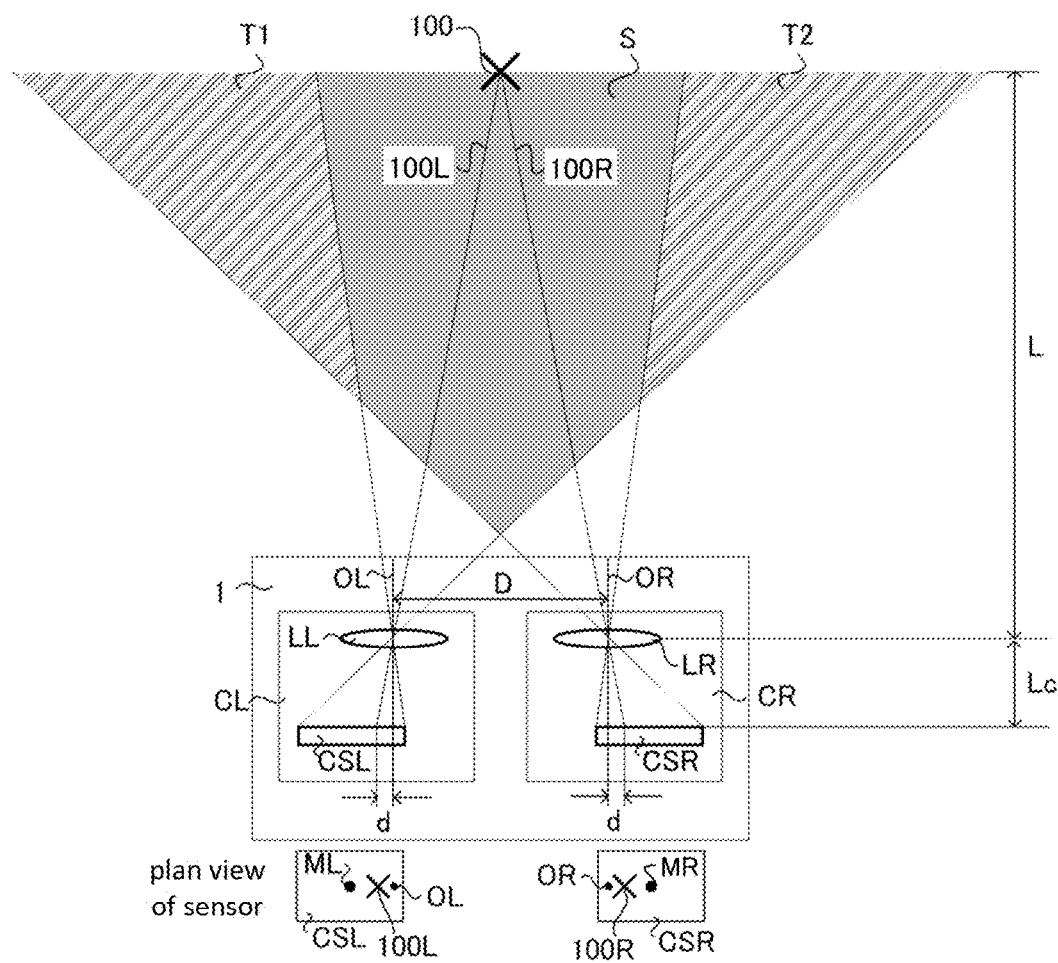
FIG. 1 is a configuration diagram of a stereo camera 1 according to an embodiment 1.

FIG. 1 is a configuration diagram of a stereo camera 1 according to an embodiment 1 of this disclosure. The image processor will be described later. This example describes a case for detecting a depth and a position of a target object 100 from the stereo camera 1. The stereo camera 1 includes a right camera CR, a left camera CL, and a processor (details will be described later) that processes outputs from the two cameras.

The right camera CR will be described below. The light 100R reflected from or transmitted through the target object 100 travels through a center of a lens LR of the right camera CR, and then enters a sensor CSR. The light 100R transmitted through the center of the lens LR does not enter around a center MR on the sensor CSR, but enters a left side of the sensor CSR. The right bottom portion of FIG. 1 illustrates a plan view of the sensor CSR. The sensor CSR is shifted away from the camera CL with respect to an optical axis OR of the lens LR. Thus the light 100R enters at the left side of the center MR of the sensor.

The left camera CL will be described below. The light 100L reflected from or transmitted through the target object 100 travels through a center of a lens LL of the left camera CL, and then enters a sensor CSL. The light 100L transmitted through the center of the lens LL does not enter around a center ML on the sensor CSL, but enters a right side of the sensor CSL. The left bottom portion of FIG. 1 illustrates a plan view of the sensor CSL. The sensor CSL is shifted away from the camera CR with respect to an optical axis OL of the lens LL. Thus the light 100L enters at the right side of the center ML of the sensor.

Now it is assumed that: a distance between the target object 100 and the lens is L; a distance between the two cameras is D (hereinafter, referred to as base line length); a distance between the lens and the sensor (between the lens LR and the sensor CSR, between the lens LL and the sensor CSL) is Lc; a distance between incident positions of the light 100R, 100L onto the sensor (the sensor CSR or the sensor CSL) and the axes OR, OL is d. According to geometrical similarity, L:D/2=Lc:d. Therefore, d=DLc/(2L). If a focal length of the lens is f, Lc=fL/(L−f) according to lens formula. From those equations, d=DfL/{(2L)(L−f)}.

In PTL1, if a maximum length is Lmax by which the stereo camera 1 can detect the distance to the target object 100, the sensor CSR and the sensor CSL are shifted by DfLmax/{(2L) (L−f)}, toward a direction away from each other. Under such configuration, PTL1 attempts to enlarge a common field of view (stereo field of view) that is detectable by two sensors.

The maximum distance Lmax is a maximum distance at which it is possible to acquire images with accuracy that is sufficient for detecting the distance and the position of the target object 100. For example, if the target object 100 is extremely far away, the images captured by the sensors CSR and CSL are blurred. Thus it is impossible to precisely detect the distance and the position of the target object 100 (the detection accuracy is below acceptable range). The maximum distance Lmax is a maximum distance at which such problem does not occur.

In the embodiment 1, the sensors CSR and CSL are shifted away from each other by more than DfLmax/{(2L)(L−f)}. Accordingly, three field of views will be generated: a common field of view S (the pasted area in FIG. 1) detectable by the two sensors; a field of view T1 (the hatched area) detectable only by the sensor CSR; a field of view T2 (the hatched area) detectable only by the sensor CSL. By enlarging the field of views T1 and T2, it is possible to enlarge the viewing angle detectable by the stereo camera 1, though they are monocular field of views.

Further, the lenses LR and LL in the embodiment 1 have peripheral portions distorted more than the equidistant projection (fθ (f: focal length, θ: viewing angle)) with respect to the viewing angle θ. An fθ lens has a characteristic in which the image height is increased as the viewing angle θ in increased. On the other hand, the lenses LR and LL have a characteristic approximately same as that of an fθ lens (i.e. θ is proportional to image height) at areas with small viewing angle θ, whereas the image height is smaller than that of an fθ lens at areas with large viewing angle θ (i.e. peripheral portions). In other words, the lenses LR and LL in the embodiment 1 have a characteristic in which the increment of the image height is gradually decreased as θ is increased. One of such lenses is an orthographic projection (f sin θ) lens. According to such configurations, it is possible to enlarge the viewing angle than that of fθ lens even with same sensor size, as described further below.

The resolution of sensor is defined by the field of view of sensor with respect to pixel. Decreasing the resolution corresponds to increasing field of view of sensor with respect to pixel. Thus the embodiment 1 uses lenses with distorted portions, thereby attempting to enlarge the field of view of the peripheral portion with respect to pixel so that the field of view of the device is increased. In this case, the resolution at the peripheral portion is smaller than that of the central portion (the area with small value of θ). However, in the case of on-vehicle camera or drone-mounted camera, it is necessary for the resolution in the moving direction to be high enough, whereas the resolution at peripheral portions could be lower than that of the central portion. In such applications, the embodiment 1 may have better advantages by enlarging the viewing angle at peripheral portions.

The distance L is: from 50 meters to 250 meters (or more) for on-vehicle cameras or drone-mounted cameras; from 2 meters to 5 meters when equipped in inspecting devices; from 10 meters to 20 meters when equipped in robots or the like. The distance Lc between the lens and the sensor is adjusted so that the target object 100 is most clearly seen depending on applications.

Figure 2:
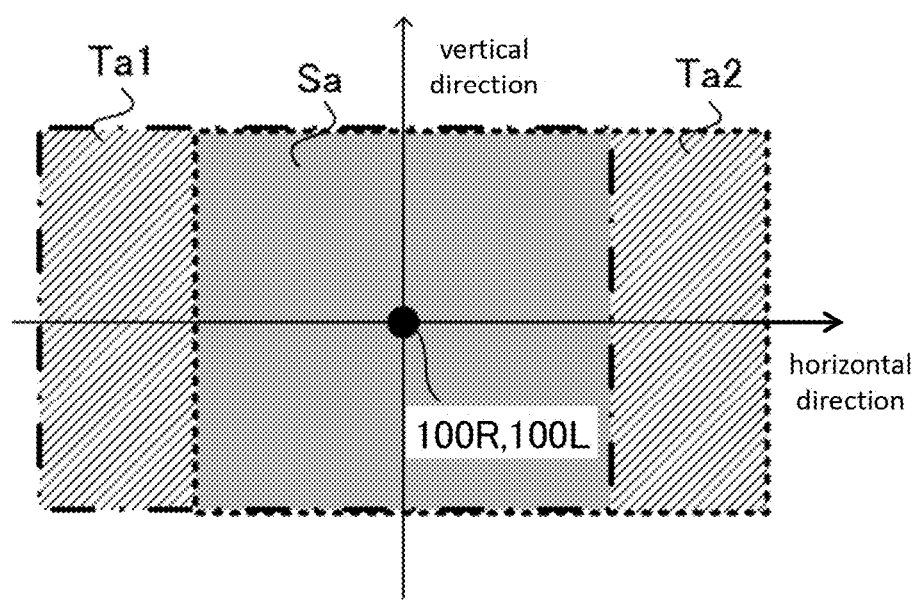
FIG. 2 is a schematic diagram of positions of two sensors with respect to an optical axis of the stereo camera 1.

FIG. 2 is a schematic diagram of positions of two sensors with respect to an optical axis of the stereo camera 1. The vertical axis indicates a vertical direction. The horizontal axis indicates a horizontal direction. The origin point indicates positions of the light 100L and the light 100R. The dotted line indicates the sensor CSR of the camera CR. The long dashed short dashed line indicates the sensor CSL of the camera CL. In the embodiment 1, the sensor ranges detected by the left and right cameras are different from each other. Accordingly, three ranges are generated: a common range Sa (pasted area) detectable by the two sensors; a range Ta1 (hatched area) detectable only by the sensor CSR; a range Ta2 (hatched area) detectable only by the sensor CSL. These ranges correspond to the common field of view S, the field of view T1, and the field of view T2 described in FIG. 1, respectively.

Figure 3:
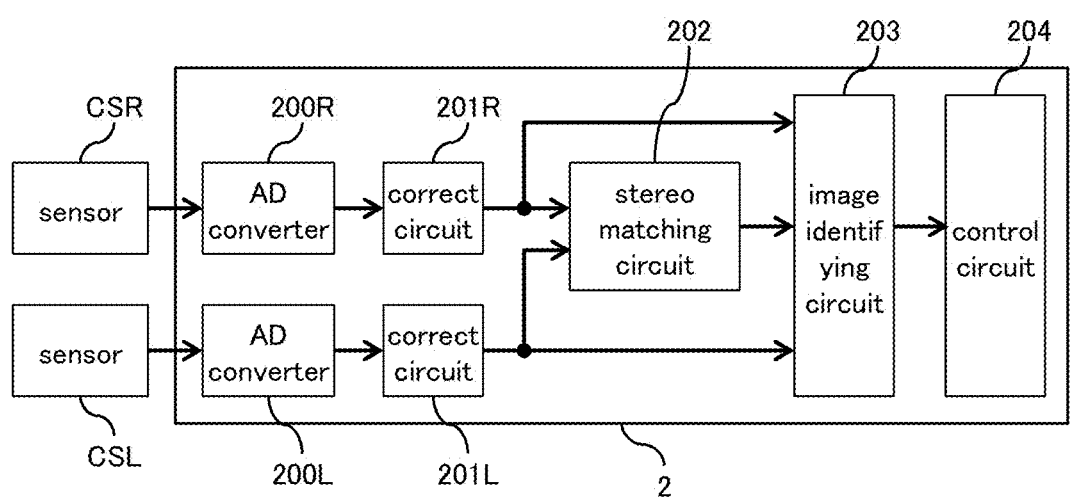
FIG. 3 is a functional block diagram of a processor 2 included in a stereo image processing device according to the embodiment 1.

FIG. 3 is a functional block diagram of a processor 2 included in a stereo image processing device according to the embodiment 1. The A/D converters 200R and 200L convert the image signals detected by the sensors CSR and CSL into digital signals, respectively. The correct circuit 201R and 201L convert distorted images into a predetermined projection scheme. For example, the correct circuit converts from orthographic projection into central projection (f tan θ). The stereo matching circuit 202 converts the image in the common field of view (the field of view Sa in FIG. 2) into distance image data, and outputs the distance image data to the image identifying circuit 203. The images of monocular field of view (the field of views Ta1 and Ta2 in FIG. 2) are also outputted to the image identifying circuit 203 simultaneously. The image identifying circuit 203 identifies objects included in the acquired image data, thereby generating information about whether car/human/obstacle is included in the image, distance information, or information about such as road sign/road signal, and outputs the information to the control circuit 204. The control circuit 204 controls the car according to the information acquired form the image identifying circuit 203.

Embodiment 1: Difference from Prior Arts

Hereinafter, differences will be described between PTL1 and the embodiment 1. PTL1 also shifts the sensor position from the optical axis, as in the embodiment 1. However, PTL1 is different from the embodiment 1 in that PTL1 shifts the sensor in order to enlarge the stereo field of view. On the other hand, the embodiment 1 intentionally reduces the stereo field of view and increases the monocular field of view, thereby enlarging the effective field of view.

Stereo cameras equipped in inspecting devices or in robots are required to highly precisely detect depth or position of object in all field of views. Thus the stereo camera may be required to keep the maximum stereo field of view. On the other hand, stereo cameras equipped in vehicles or in drones are required to highly precisely detect depth or position of object within a predetermined angle range with respect to the moving direction, whereas not required such high precision in other angles. Therefore, even monocular detection may satisfy performance requirements. Thus in contrast to PTL1, the embodiment 1 intentionally reduces the stereo field of view and increases the monocular field of view, thereby enlarging the effective field of view.

Figure 4A:
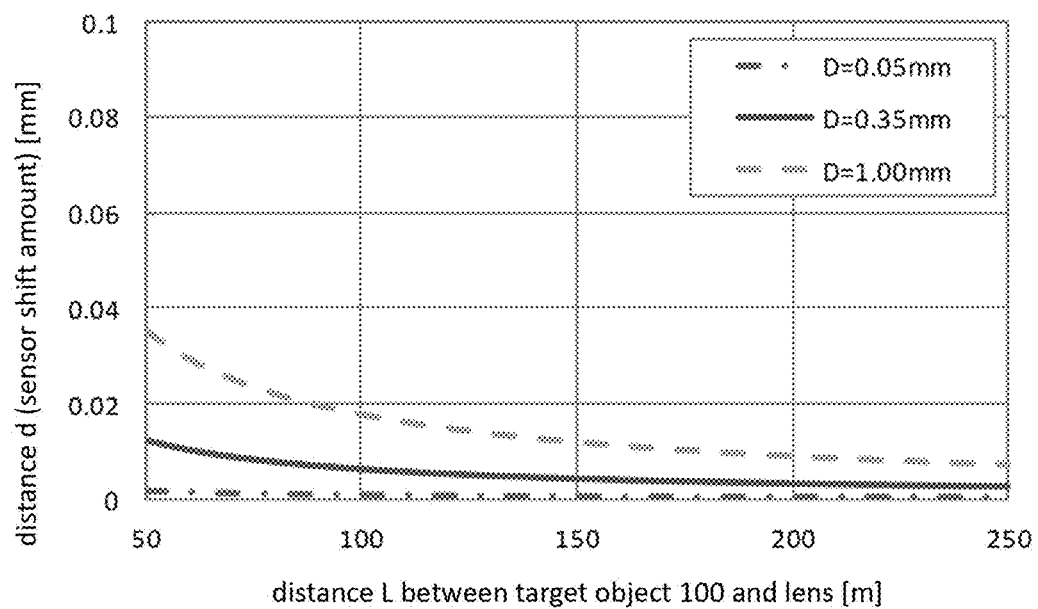
FIGS. 4A and 4B are graphs illustrating a dependency of distance d on a distance L.
Figure 4B:
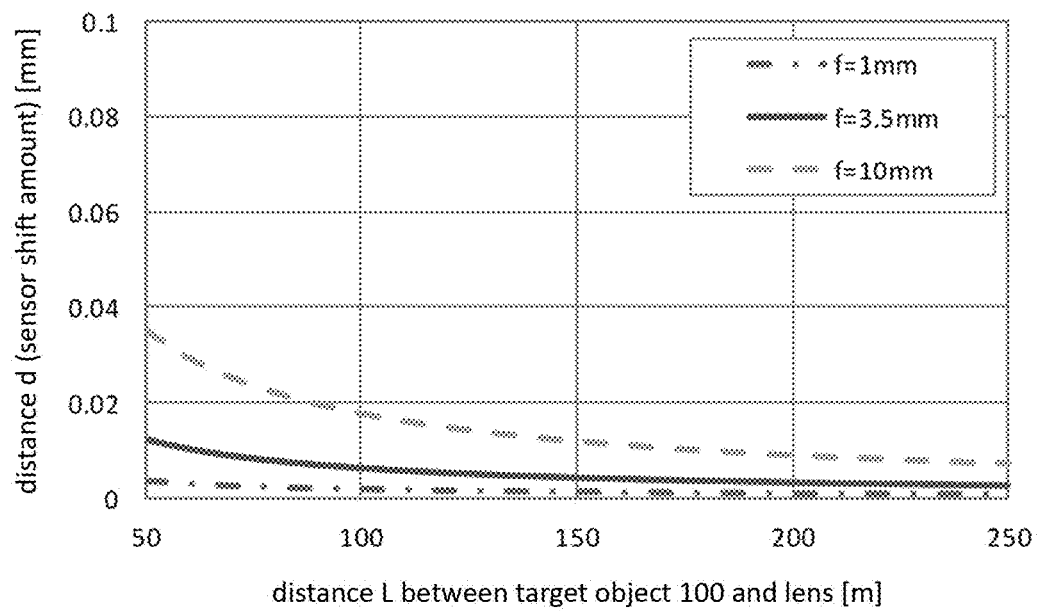

FIG. 4 is a graph illustrating a dependency of distance d on a distance L. The vertical axis indicates the distance d. The horizontal axis indicates the distance L. Each line in FIG. 4 (a) indicates the base line length D. Each line in FIG. 4 (b) indicates the focal length f of the lens. In FIG. 4 (a), the lens focal length f: 3.5 mm, the base line length D: 0.05 m to 1.00 m. In FIG. 4 (b), the lens focal length f: 1 mm to 10 mm, the base line length D: 0.35 m.

According to FIG. 4, when the focal length f is 3.5 mm, the base line length D is 0.35 mm, and the distance L is 100 m, for example, the distance d is approximately 0.006 mm. This corresponds to two pixels assuming that the pixel size of the sensor is 0.003 mm. This condition does not significantly vary even by changing not only the base line length D but also the focal length f. For example, when the focal length f is 10 mm, the base line length is 0.35 mm, and the distance L is 50 m, the distance d is approximately 0.040 mm or less, which corresponds to ten plus several pixels. PTL1 shifts the sensor by two to ten plus several pixels, thereby keeping the maximum stereo field of view. On the other hand, the embodiment 1 shifts the sensor by 0.1 mm to several mm (depending on the sensor size), thereby enlarging the effective field of view. In other words, the embodiment 1 shifts the sensor by much larger amount than that of PTL1.

Figure 5:
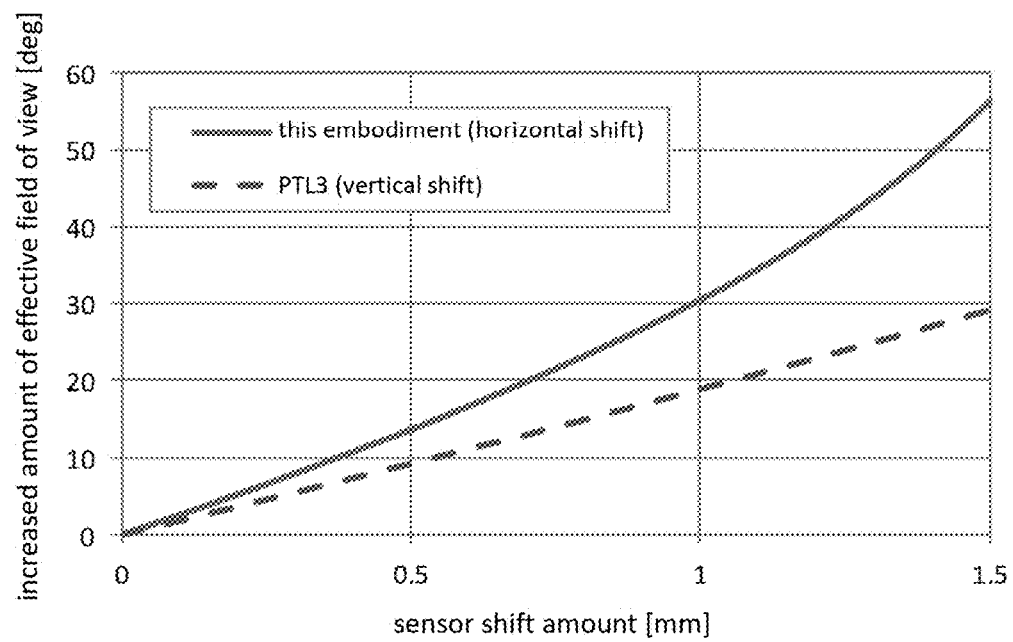
FIG. 5 is a graph illustrating a relationship between a sensor shift amount and an increased amount of effective field of view.

FIG. 5 is a graph illustrating a relationship between a sensor shift amount and an increased amount of effective field of view. This graph also illustrates the same relationship in PTL3 for comparison. The optical conditions are as below: (a) projection scheme: orthographic projection, (b) lens focal length f: 3.5 mm, (c) sensor pixel size: 2.75 μm (horizontal)×2.75 μm (vertical), (d) number of sensor pixels: 1956 pixels (horizontal)×1266 pixels (vertical).

PTL3 shifts two cameras vertically and opposite to each other with respect to the lens, thereby enlarging the effective field of view. This scheme enlarges the effective field of view by shifting the sensor, whereas it is difficult to achieve the effect of wide view lens with distorted portions. The dotted line in FIG. 5 shows about it. On the other hand, by shifting the sensor horizontally as in the embodiment 1, it is possible to increase the effective field of view more than PTL3. The reason for such increased effective field of view may be assumed as below.

By using distorted lens, the field of view at the peripheral portion is enlarged with respect to the pixel. Stereo cameras are typically required to identify objects in the horizontal direction, and thus the sensor size in the horizontal direction is large. Therefore, it is possible to readily achieve the effect of lens distorted in the horizontal direction. On the other hand, the sensor size in the vertical direction is smaller than that of the horizontal direction, and thus it is barely possible to achieve the effect of distortion. Information in the horizontal direction is important in on-vehicle sensors, and thus the sensor size in the horizontal direction could be further increased more than typical imaging sensors. Therefore, the increased amount of effective field of view may be further larger in the horizontal direction than in the vertical direction.

Figure 6A:
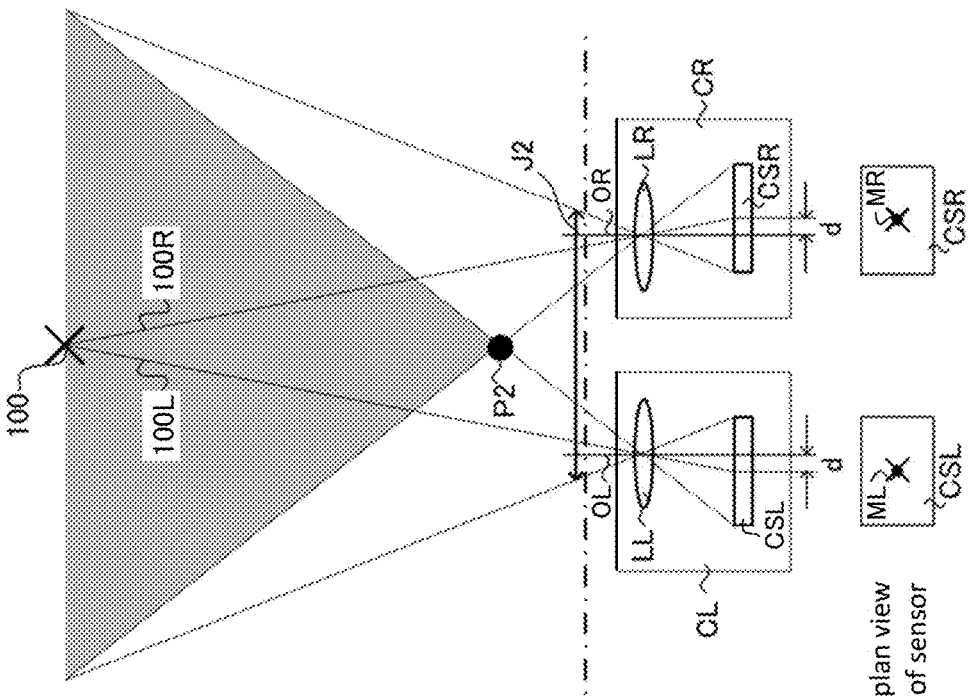
FIGS. 6A and 6B are diagrams describing a difference of viewing angle.
Figure 6B:
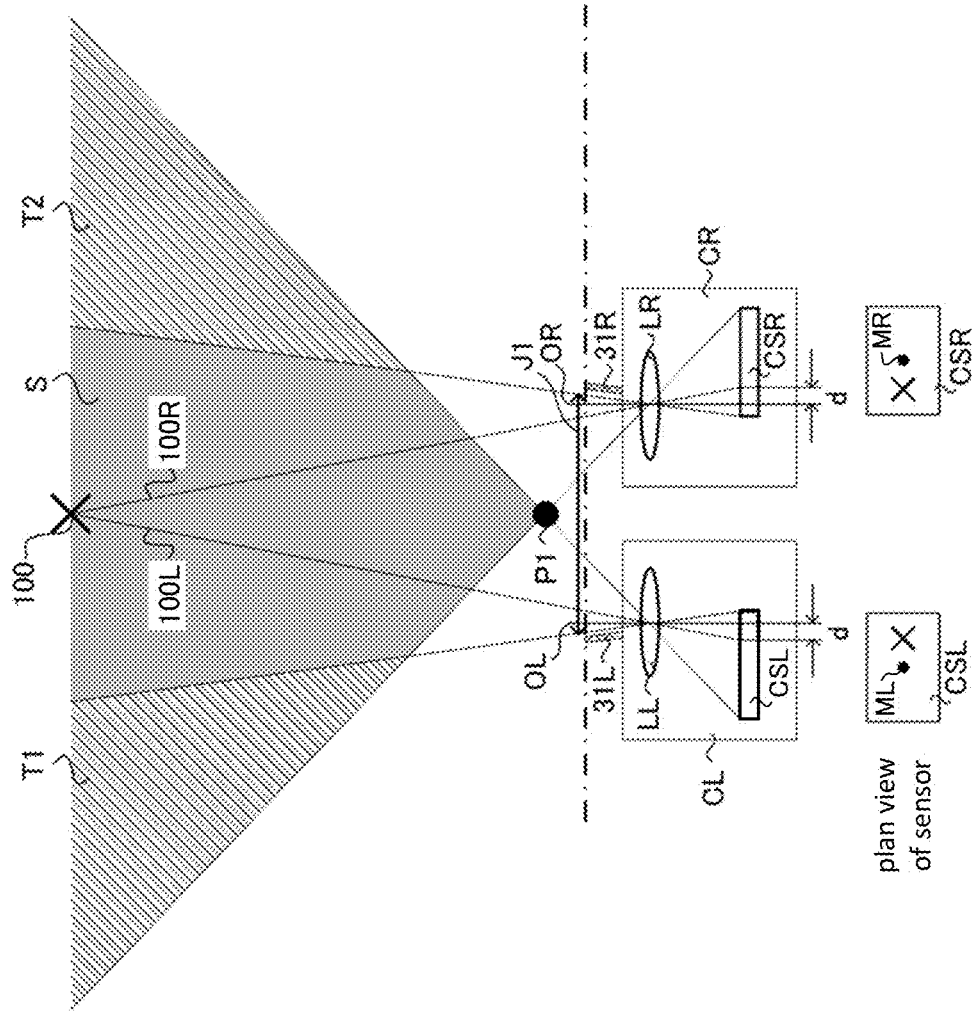
Figure 7A:
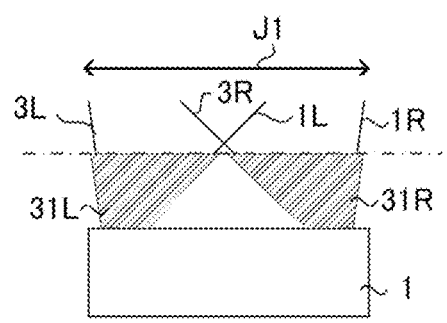
FIGS. 7A to 7D are configuration diagrams of a shading cover according to the embodiment 1.
Figure 7B:
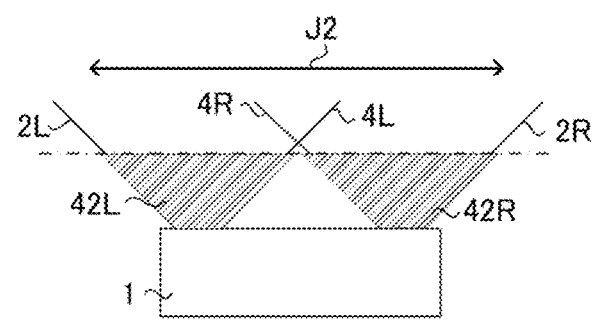
Figure 7C:
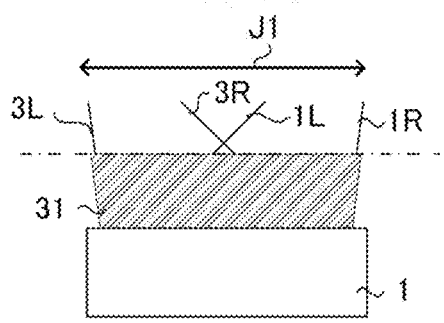
Figure 7D:
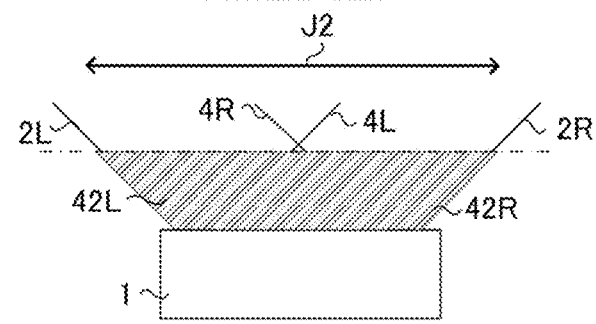

FIG. 6 is a diagram describing a difference of viewing angle. FIG. 6 (a) illustrates the stereo camera 1 according to the embodiment 1. FIG. 6 (b) illustrates a stereo camera in PTL1. When equipping a stereo camera on a car having a short engine hood such as tracks or small cars, it is required to detect proximities of the car. P1 and P2 in FIG. 6 indicate the target object that can be seen with stereo view. The camera CR detects the left field of view and the camera CL detects the right field of view, in the embodiment 1. Thus the embodiment 1 can detect closer ranges than PTL1, because the two cameras detect the same field of view in PTL1.

Therefore, the embodiment 1 is advantageous over PTL1 in terms of detecting proximities.

The stereo camera 1 in the embodiment 1 focuses the target object 100 which distance L is 50 meters to 250 meters. Thus proximate objects may be blurred. However, when detecting proximate objects, the positional disparity of the target object 100 between two images is significantly large. Thus there is no problem in detecting the position even by using blurred images.

The embodiment 1 contributes to reducing the size of stereo camera. Covers are placed between the lens and the front glass in on-vehicle stereo cameras, so that out-of-sight light does not enter the camera. For example, assuming that the long dashed short dashed line in FIG. 6 is the front glass, a cover is necessary which size is larger than the distances J1 and J2 in order to keep the field of view. As illustrated in FIG. 6, the distance J1 is shorter than the distance J2, and thus the cover size in the stereo camera 1 of the embodiment 1 could be smaller than that of PTL1. Accordingly, the size of the stereo camera 1 could be reduced.

For example, if the two cameras are conventional cameras detecting the same field of view, the shading cover should be attached at or above the viewing angle so as not to block the field of view. On the other hand, it is possible in the embodiment 1 to attach the shading cover at an inclination less than the effective field of view of the two cameras, as illustrated by the shading covers 31R and 31L in FIG. 6 (a). Accordingly, it is possible to reduce the size of the stereo camera 1.

FIG. 7 illustrates an example of a shading cover. FIG. 7 (a) illustrates a shading cover according to the embodiment 1; FIG. 7 (b) illustrates a conventional shading cover. The conventional example illustrates a case where the target object is far away (e.g. the distance L is 100 m) in PTL1. FIG. 7 (a) (b) both illustrate shading covers achieving a same field of view. FIG. 7 (c) (d) illustrates configurations where the shading covers in FIG. 7 (a) (b) are integrated.

In the case of FIG. 7 (a), the shading cover 31R is placed along with the right detection limit 1R and the left detection limit 3R of the right camera sensor, and the shading cover 31L is placed along with the right detection limit 1L and the left detection limit 3L of the left camera sensor. In the case of FIG. 7 (b), the shading cover 42R is placed along with the right detection limit 2R and the left detection limit 4R of the right camera sensor, and the shading cover 42L is placed along with the right detection limit 4L and the left detection limit 2L of the left camera sensor.

In the embodiment 1, the angle of outer side of the shading cover is smaller (same angle as the right detection limit 1R and the left detection limit 3L) than the maximum viewing angle detected by the right camera sensor (left detection limit 3R) and than the maximum viewing angle detected by the left camera sensor (right detection limit 1L). On the other hand, in the conventional configuration, the angle of outer side of the shading cover is same as the maximum viewing angle detected by the right camera sensor (right detection limit 2R) and as the maximum viewing angle detected by the left camera sensor (right detection limit 4L).

Accordingly, in the conventional configuration of FIG. 7 (b), the size of shading cover is large and thus it is necessary to increase the overall size of the stereo camera. On the other hand, in the embodiment 1 of FIG. 7 (a), the shading cover is not significantly spread out from the body of the stereo camera 1. Thus it is possible to reduce the overall size of the stereo camera. Stereo camera is required to reduce the size because it is placed before the driver sheet, thus the embodiment 1 is significantly advantageous. The same reason applies to FIG. 7 (c) (d) where the shading covers are integrated. The shape of shading cover in the embodiment 1 is determined according to the detection limits. However, the shape of shading cover is not limited to such configurations. The same technical effect is achieved even when an angular margin is provided in the inclination of the shading cover.

The technical effect of the embodiment 1 also applies to wipers. The movable range of wiper in the embodiment 1 may be smaller than that of PTL1. If it is necessary to keep a large movable range of wiper, the states of cameras CR and CL with respect to rains are different from each other. Thus highly precise detection cannot be achieved. For example, if a camera captures images after the rain is wiped, and another camera captures images without wiped, then the detection accuracy is decreased.

If the movable range of wiper is small as in the embodiment 1, it is readily possible to match the states with respect to the rain between the cameras CR and CL. Therefore, compared to the stereo camera in PTL1, the stereo camera 1 in the embodiment 1 can detect the target object 100 with small size of the stereo camera 1, while achieving high precision and wide field of view. Such advantageous effect is not achieved at all in configurations where the sensor is vertically shifted as in PTL3.

The stereo camera 1 in the embodiment 1 does not shift the camera but shifts the sensor. Thus there is only a small risk of reduced detection accuracy due to the difference of distortion in the lenses between the cameras CR and CL, as in PTL2.

Embodiment 1: Summary

The stereo image processing device according to the embodiment 1 intentionally reduces the stereo field of view and increases the monocular field of view, thereby it is possible to enlarge the effective field of view. Further, by using lenses with distorted peripheral portions, it is possible to further enlarge the viewing angle.

Embodiment 2

Figure 8:
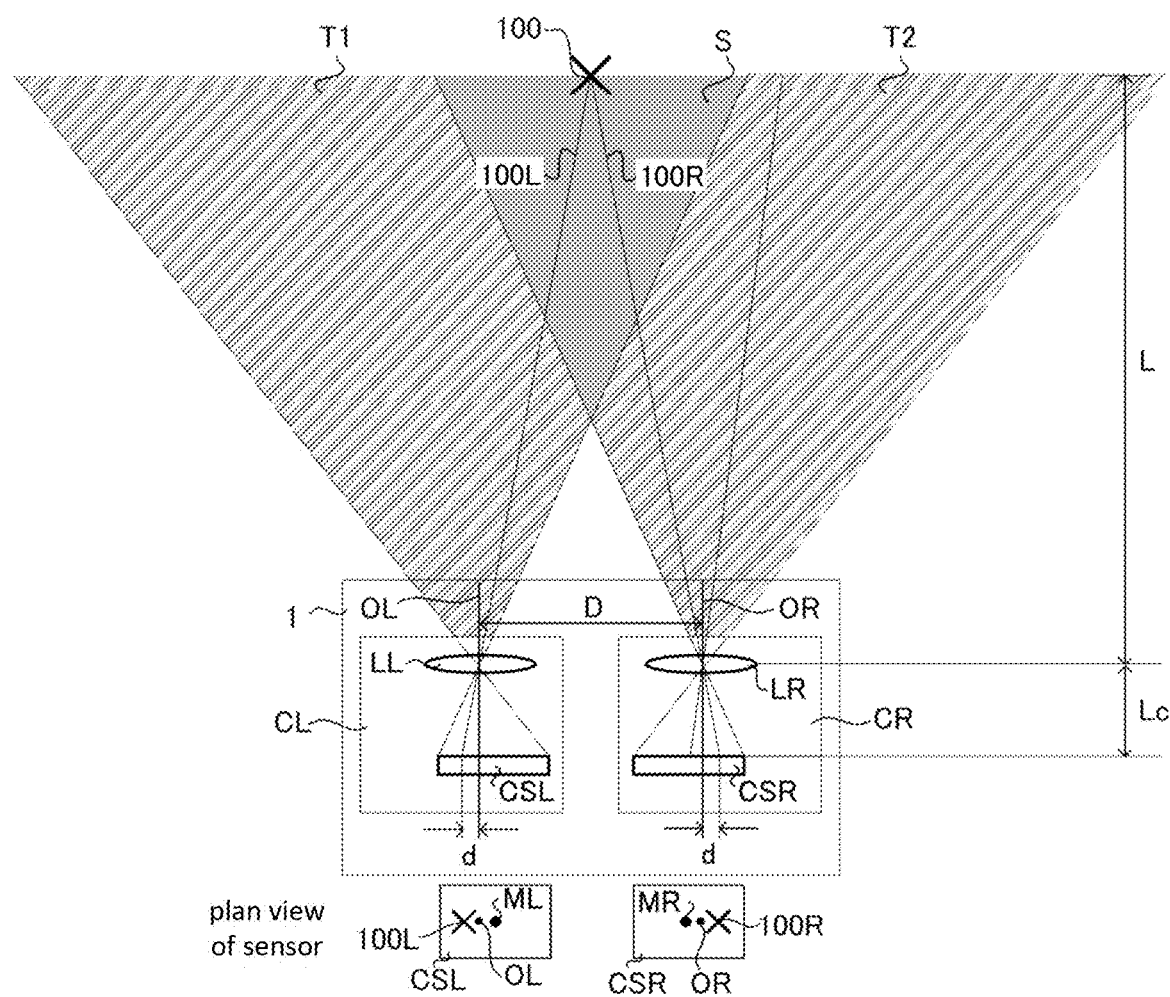
FIG. 8 is a configuration diagram of the stereo camera 1 according to an embodiment 2.

FIG. 8 is a configuration diagram of the stereo camera 1 according to an embodiment 2 of this disclosure. In the embodiment 2, in contrast to the embodiment 1, the two sensors are shifted approaching to each other with respect to the optical axis. Other configurations are same as in the embodiment 1.

The right camera CR will be described below. The light 100R reflected from or transmitted through the target object 100 travels through the center of the lens LR, and enters the sensor CSR. The light 100R transmitted through the center of the lens LR does not enter around the center MR of the censor CSR but enters the right side of the sensor CSR.

The left camera CL will be described below. The light 100L reflected from or transmitted through the target object 100 travels through the center of the lens LL, and enters the sensor CSL. The light 100L transmitted through the center of the lens LL does not enter around the center ML of the censor CSL but enters the left side of the sensor CSL.

In the embodiment 2: the center MR of the sensor CSR is shifted leftward with respect to the axis OR passing through the center of the lens LR; the center ML of the sensor CSL is shifted rightward with respect to the axis OL passing through the center of the lens LL.

According to the embodiment 2, it is possible to detect the object earlier than the embodiment 1 by an amount corresponding to the base line length D. For example, when detecting the left field of view, the camera CL detects it in the embodiment 2 and the camera CR detects it in the embodiment 1. The camera CL can detect the target object 100 at the left side earlier than the camera CR by an amount corresponding to the base line length D. For example, assuming that the total lateral size of a car is the base line length D, the target object 100 may be detected earlier by an amount corresponding to 2.5 meters in a case of normal cars. This is advantageous when identifying the target object 100 that moves rapidly such as bicycles.

Embodiment 2: Summary

The stereo image processing device according to the embodiment 2 intentionally reduces the stereo field of view and increases the monocular field of view, thereby it is possible to enlarge the effective field of view, as in the embodiment 1. Further, the sensors CSR and CSL are shifted approaching to each other with respect to the optical axis, thereby it is possible to identify the target object 100 earlier in the monocular field of view area.

Embodiment 3

Figure 9:
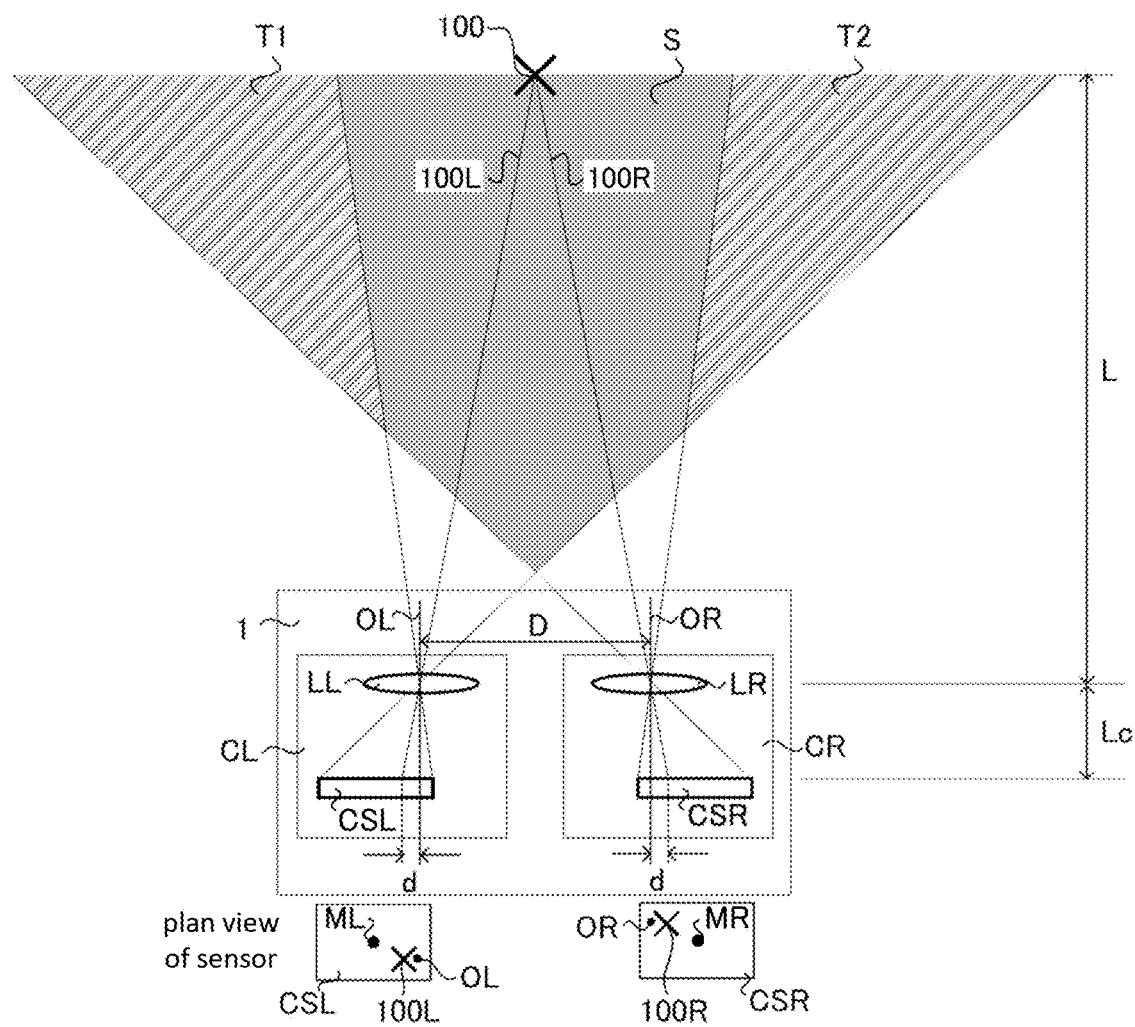
FIG. 9 is a configuration diagram of the stereo camera 1 according to an embodiment 3.

FIG. 9 is a configuration diagram of the stereo camera 1 according to an embodiment 3 of this disclosure. In the stereo camera 1 of the embodiment 3, the sensors CSR and CSL are shifted approaching to each other as in the embodiment 1, and further shifted in the vertical direction opposite to each other. In FIG. 9, the sensor CSR is shifted downward in the vertical direction and the sensor CSL is shifted upward in the vertical direction. Other configurations are as in the embodiment 1.

The right camera CR will be described below. The light 100R reflected from or transmitted through the target object 100 travels through the center of the lens LR of the right camera CR, and enters the sensor CSR. The light 100R transmitted through the center of the lens LR does not enter around the center MR of the sensor but enters the left top area of the sensor CSR. In other words, the center MR of the sensor CSR is shifted to right bottom area with respect to the axis OR passing through the center of the lens LR.

The left camera CL will be described below. The light 100L reflected from or transmitted through the target object 100 travels through the center of the lens LL of the left camera CL, and enters the sensor CSL. The light 100L transmitted through the center of the lens LL does not enter around the center ML of the censor but enters the right bottom area of the sensor CSL. In other words, the center ML of the sensor CSL is shifted to left top area with respect to the axis OL passing through the center of the lens LL.

Figure 10:
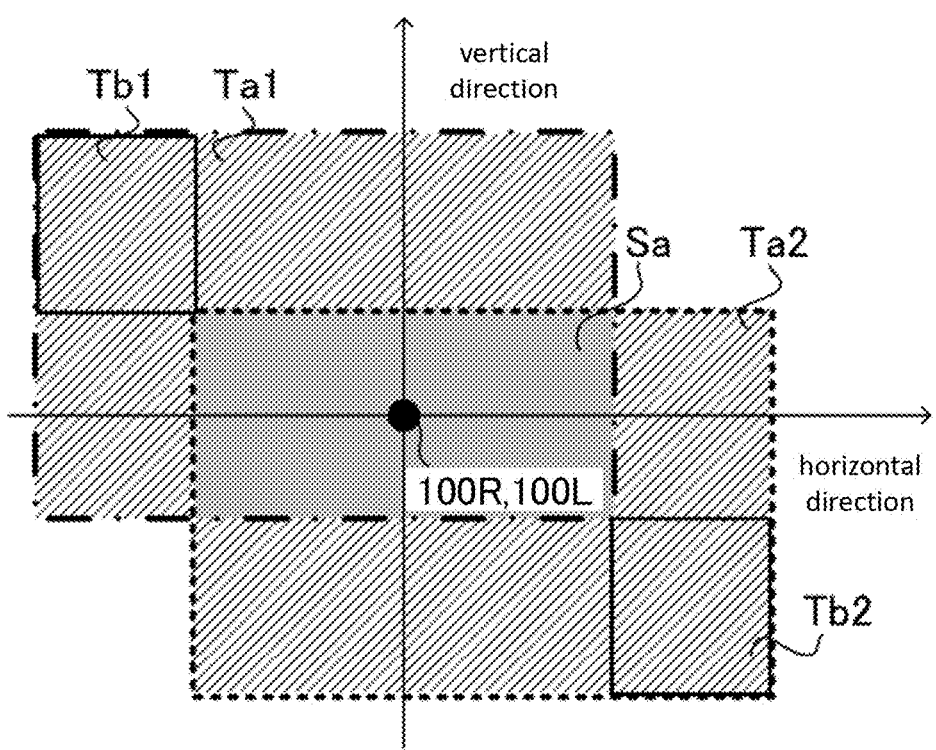
FIG. 10 is a schematic diagram of positions of two sensors with respect to an optical axis of the stereo camera 1.

FIG. 10 is a schematic diagram of positions of two sensors with respect to an optical axis of the stereo camera 1. The vertical axis indicates the vertical direction. The horizontal axis indicates the horizontal direction. The origin point indicates positions of the light 100L and the light 100R. The dotted line indicates the sensor CSR of the camera CR. The long dashed short dashed line indicates the sensor CSL of the camera CL. In the embodiment 3, the ranges Tb1 and Tb2 are detectable in addition to the detectable ranges of PTL1 or PTL 3. For example, when starting a parked car, it is necessary to detect proximate road signs, signboards, or white lines in diagonal directions. The embodiment 3 can detect them by the ranges Tb1 and Tb2.

In a case of left lanes as in Japanese roads, the camera CR is shifted with respect to the axis OR passing through the center of the lens LR so that the center MR of the sensor CSR is shifted to right bottom area as in the embodiment 3, thereby it is possible to detect proximate road signs or signboards in the left top area. In addition, the camera CL is shifted with respect to the axis OR passing through the center of the lens LL so that the sensor CSL is shifted to left top area, thereby it is possible to detect proximate white lines in the right bottom area. In a case of right lanes as in United States roads, the right camera CR is shifted with respect to the axis OR passing through the center of the lens LR so that the center MR of the sensor CSR is shifted to right top area, thereby it is possible to detect proximate white lines in the left bottom area. In addition, the camera CL is shifted with respect to the axis OL passing through the center of the lens LL so that the sensor CSL is shifted to left bottom area, thereby it is possible to detect proximate road signs or signboards in the right top area.

Embodiment 3: Summary

The stereo image processing device according to the embodiment 3 shifts the two sensors in the diagonal direction, thereby achieving new field of views (field of views corresponding to the ranges Ta1 and Tb2). The embodiment 3 describes that the two sensors are shifted away from each other in the vertical direction. However, by shifting the sensors approaching to each other in the vertical direction, it is possible to achieve the same effect as in the embodiment 3.

The embodiment 3 shifts the sensors CSR and CSL in the diagonal direction. Considering that the sensor size in the diagonal direction is larger than that of the horizontal and vertical directions, the increased amount of effective field of view described in FIG. 5 could be further increased.

<Modification of this Disclosure>

The present disclosure is not limited to Embodiments described above, but includes various modified examples. For example, Embodiments described above have been described in detail in order to explain the present disclosure in an easy-to-understand manner, and the present disclosure is not necessarily limited to those having all the configurations described. Further, part of a configuration of one embodiment can be replaced with a configuration of another embodiment, and the configuration of another embodiment can be added to the configuration of the one embodiment. In addition, with respect to part of the configuration of each embodiment, it is possible to add, delete, and replace other configurations.

The two sensors in the stereo camera 1 are not necessarily shifted by a same amount. As long as the stereo view and the monocular view are achieved simultaneously, the same effect as in the embodiments above will be achieved.

Each of functional units included in the processor 2 may be constructed using hardware such as circuit devices that implements functionalities of those functional units, or may be constructed by processors executing software that implements functionalities of those functional units.

The control circuit 204 may be provided outside of the stereo image processing device. In FIG. 3, the correct circuits 201R and 201L convert the projection scheme. However, such conversion is not always necessary and the image detected by the camera may be used without conversion. The depth and position of the object may be detected according to temporal variation of the object or size of the object, using parts of image data (the field of views Ta1 and Ta2 in FIG. 2) of the cameras CR and CL.

In the embodiments above, it is described that d=DfL/{(2L)(L−f)}. When the present disclosure is applied to on-vehicle camera or drone-mounted camera, the equation may be approximated as d=Df/(2L), because L (in the order of 100 meters) is much larger than f (in the order of several millimeters).

In the embodiment 3, a difference is described with examples of Japanese and United States roads. This is merely an example, and any type of target object may be detected using the new field of view (the field of views corresponding to the ranges Ta1 and Tb2).

REFERENCE SIGNS LIST

100: stereo camera
2: processor
100: target object
200R, 200L: A/D converter
201R, 201L: correct circuit
202: stereo matching circuit
203: image identifying circuit
204: control circuit
CR, CL: camera
LR, LL: lens
CSR, CSL: sensor

The invention claimed is:

1. A stereo image processing device that processes a stereo image, comprising:
a first camera and a second camera that image an imaged target,
wherein the first camera includes a first lens that converges light from the imaged target and a first sensor that receives light transmitted through the first lens,
wherein the second camera includes a second lens that converges light from the imaged target and a second sensor that receives light transmitted through the second lens,
wherein the first camera and the second camera are placed away from each other,
wherein a center of the first sensor is shifted from an optical axis of the first lens by a first shift distance away from the second camera in a first direction parallel to a straight line connecting a center of the first lens and a center of the second lens,
wherein a center of the second sensor is shifted from an optical axis of the second lens by a second shift distance away from the first camera in the first direction, and
wherein the first lens and the second lens both have a characteristic in which an image height at an area of large viewing angle is smaller compared to a characteristic of a fθ lens, wherein the image height is increased in proportion to viewing angle.

2. The stereo image processing device according to claim 1,
wherein the first lens has a characteristic in which an image height at a maximum viewing angle receivable by the first sensor is smaller than an image height of the fθ lens at same maximum viewing angle, and
wherein the second lens has a characteristic in which an image height at a maximum viewing angle receivable by the second sensor is smaller than an image height of the fθ lens at same maximum viewing angle.

3. The stereo image processing device according to claim 1, wherein
a focal length of the first lens is given by f1;
a focal length of the second lens is given by f2;
a distance between a center of the first lens and a center of the second lens is given by D;
a distance from the first or the second lens to the imaged target is given by 1; and
a maximum distance by which it is possible to acquire a signal that has a sufficient accuracy for the first and the second sensors to calculate the distance 1 is L,
the first shift distance is larger than D×f1×L/{(2L)(L−f1)}, and
the second shift distance is larger than D×f2×L/{(2L)(L−f2)}.

4. The stereo image processing device according to claim 1,
wherein a center of the first sensor is shifted from an optical axis of the first lens by a first shift distance approaching to the second camera in the first direction, and
wherein a center of the second sensor is shifted from an optical axis of the second lens by a second shift distance approaching to the first camera in the first direction.

5. The stereo image processing device according to claim 1,
wherein a center of the first sensor is shifted from an optical axis of the first lens in a second direction perpendicular to the first direction and perpendicular to an optical axis of the first lens, and
wherein a center of the second sensor is shifted from an optical axis of the second lens in the second direction.

6. The stereo image processing device according to claim 5,
wherein a center of the first sensor is shifted from an optical axis of the first lens toward a first orientation and in the second direction, and
wherein a center of the second sensor is shifted from an optical axis of the second lens toward a second orientation opposite to the first orientation and in the second direction.

7. The stereo image processing device according to claim 1, further comprising a first shading cover that blocks light incident onto the first lens from a source other than the imaged target and a second shading cover that blocks light incident onto the second lens from a source other than the imaged target,
wherein the first shading cover is attached to the first camera at an inclined angle, with respect to an optical axis of the first lens, smaller than a maximum viewing angle of the second sensor, and
wherein the second shading cover is attached to the second camera at an inclined angle, with respect to an optical axis of the second lens, smaller than a maximum viewing angle of the first sensor.

8. The stereo image processing device according to claim 1,
wherein the first sensor is placed so that light is receivable from the imaged target included within a first viewing angle range,
wherein the second sensor is placed so that light is receivable from the imaged target included within a second viewing angle range,
wherein the first viewing angle range and the second viewing angle range include common viewing angle ranges overlapping with each other, and
wherein the stereo image processing device further comprises a stereo processor that processes a signal generated according to light received by the first sensor from the imaged target included within the common viewing angle range and a signal generated according to light received by the second sensor from the imaged target included within the common viewing angle range.

9. The stereo image processing device according to claim 8, further comprising a non-stereo processor that processes a signal generated according to light received by the first sensor from the imaged target that is not included within the common viewing angle range and a signal generated according to light received by the second sensor from the imaged target that is not included within the common viewing angle range.

10. The stereo image processing device according to claim 1,
wherein the first shift distance and the second shift distance do not depend on a distance from the stereo image processing device to the imaged target.

11. The stereo image processing device according to claim 1,
wherein the distance from the stereo image processing device to the imaged target is 50 meters or more.

12. The stereo image processing device according to claim 1, wherein the first shift distance is different from the second shift distance.

* * * * *